(12) United States Patent
Kotaka et al.

(10) Patent No.: US 8,705,937 B2
(45) Date of Patent: Apr. 22, 2014

(54) CAPTURED IMAGE DATA MANAGEMENT METHOD AND IMAGE CAPTURING APPARATUS

(75) Inventors: Nobuhiro Kotaka, Kanagawa (JP); Takayoshi Kawamura, Kanagawa (JP); Takuji Moriya, Kanagawa (JP); Hisao Kimura, Kanagawa (JP)

(73) Assignee: Sony Corporation (JP)

( * ) Notice: Subject to any disclaimer, the term of this patent is extended or adjusted under 35 U.S.C. 154(b) by 704 days.

(21) Appl. No.: 12/384,752

(22) Filed: Apr. 8, 2009

(65) Prior Publication Data

US 2009/0279851 A1 Nov. 12, 2009

(30) Foreign Application Priority Data

Apr. 9, 2008 (JP) ................................ P2008-101123

(51) Int. Cl.
 *H04N 5/76* (2006.01)

(52) U.S. Cl.
 USPC ........... 386/248; 386/241; 386/243; 386/253; 386/286; 386/290; 386/296; 386/299

(58) Field of Classification Search
 USPC ......... 386/241, 243, 244, 248, 253, 286, 290, 386/296, 299
 See application file for complete search history.

(56) References Cited

U.S. PATENT DOCUMENTS

| | | | |
|---|---|---|---|
| 6,571,246 B1 * | 5/2003 | Anderson et al. .............. | 707/792 |
| 2003/0169738 A1 * | 9/2003 | McDaniel ...................... | 370/392 |
| 2004/0218902 A1 | 11/2004 | Yanagita | |
| 2005/0183018 A1 | 8/2005 | Shinkai et al. | |
| 2007/0025693 A1 * | 2/2007 | Shibata et al. .................. | 386/95 |
| 2007/0166003 A1 * | 7/2007 | Herz et al. ...................... | 386/83 |
| 2007/0196075 A1 * | 8/2007 | Yanagita ........................ | 386/52 |
| 2009/0028528 A1 * | 1/2009 | Harradine et al. ............ | 386/117 |

FOREIGN PATENT DOCUMENTS

| | | | |
|---|---|---|---|
| EP | 0942584 A2 | | 9/1999 |
| EP | 1187472 A1 | | 3/2002 |
| JP | 2002-374481 A | * | 12/2002 |
| JP | 2002374481 A | | 12/2002 |
| JP | 2004280928 A | | 10/2004 |
| JP | 2005-078202 A | * | 3/2005 |
| JP | 2005078202 A | | 3/2005 |
| JP | 2005110134 A | | 4/2005 |
| JP | 2006253875 A | | 9/2006 |
| WO | WO-01/60059 A1 | | 8/2001 |
| WO | 2006028383 A1 | | 3/2006 |
| WO | 2007027605 A2 | | 3/2007 |

OTHER PUBLICATIONS

Office Action from Japanese Application No. 2008-101123, dated Mar. 9, 2010.
Sigiscar K: Code reuse with movie clip naming conventions and Actionscript 2.0 classes Internet Citation, [Online] Mar. 12, 2007, pp. 1-4, XP007909201.
Herrmann F: "Vernetzte Studioproduktion: Das 'Spectrum' Mediaserversystem" FKT Fernseh Und Kinotechnik, Fachverlag Schiele & Schon GMBH., Berlin, DE, vol. 60, No. 4, Jan. 1, 2006, pp. 199-202, XP001502998.
Anonymus: "Shooting and Capturing Great Video Assets in Adobe Premiere Pro 2.0" Internet Citation, [Online] May 26, 2006, XP002537420.
European Search Report, EP 09156567, dated Aug. 4, 2009.

* cited by examiner

*Primary Examiner* — Michael Simitoski
*Assistant Examiner* — Gary Lavelle
(74) *Attorney, Agent, or Firm* — Lerner, David, Littenberg, Krumholz & Mentlik, LLP

(57) ABSTRACT

A captured image data management method is disclosed. Coverage direction data are input to a recorder-built-in type image capturing apparatus, and the coverage direction data are recorded to a nonvolatile memory and a record medium. The captured image data are obtained as files. A name of the file recorded on the record medium is automatically assigned based on title information contained in the coverage direction data, and the assigned file name is recorded to the nonvolatile memory and the record medium.

14 Claims, 15 Drawing Sheets

Fig. 8

⟨CONTENTS OF COVERAGE DIRECTION DATA⟩
- DIRECTION ID:　　　　　　　　　　H00123
- DIRECTION PREPARATION DATE/TIME:　2008/01/20　09:00:00
- DIRECTION UPDATE DATE/TIME:　　　2008/01/20　09:00:00
- DIRECTOR:　　　　　　　　　　　　CHRIS
- TITLE (ENGLISH):　　　　　　　　JANUARY GRAND SUMO TOURNAMENT
- TITLE (JAPANESE):　　　　　　　　OHZUMO HATSUBASHO
- COVERAGE SITE:　　　　　　　　　RYOGOKU NATIONAL ARENA
- DATE OF COVERAGE:　　　　　　　2008/01/20

- NUMBER OF RECODED CLIPS:　　　　3

Fig. 13

| PRIORITY | SIZE OF Title ELEMENT | SIZE OF usAscii ATTRIBUTE | VALUE OF Prefix |
|---|---|---|---|
| 1 | 1 TO 52 BYTES, NOT CONTAINING CHARACTERS PROHIBITED FROM BEING USED FOR FILE NAME | ......... | VALUE OF Title ELEMENT |
| 2 | 0 BYTE OR 53 BYTES OR LARGER, CONTAINING CHARACTERS PROHIBITED FROM BEING USED FOR FILE NAME | 1 TO 52 BYTES, NOT CONTAINING CHARACTERS PROHIBITED FROM BEING USED FOR FILE NAME | VALUE OF usAscii ATTRIBUTE |
| 3 | 0 BYTE OR 53 BYTES OR LARGER, CONTAINING CHARACTERS PROHIBITED FROM BEING USED FOR FILE NAME | 0 BYTE OR 53 BYTES OR LARGER, CONTAINING CHARACTERS PROHIBITED FROM BEING USED FOR FILE NAME | INVALID |

FIG. 14

```
<?xml version="1.0" encoding="UTF-8"?>
<PlanningMetadata xmlns="http://xmlns.sony.net/pro/metadata/planningMetadata" assignId=H00123"
creationDate="2008-01-20T09:00:00+09:00" lastUpdate="2008-01-20T09:00:00+09:00" version="1.00">
<Properties propertyId="assignment" update="2008-01-20T09:00:00+09:00" modifiedBy="Chris">
<!-- Assignment Information (type="assignment") -->
<Title usAscii="January Grand Sumo Tournament" xml:lang="ja">OHZUMO HATSUBASHO</Title>
<Meta name="Carmeraman"content="Alan"/>
<Meta name="Producer"content="David"/>
<Meta name="Reporter"content="Nina"/>
<Meta name="Location"content="RYOGOKU KOKUGIKAN"/>
<Meta name="ShootingDate"content="2008-01-20T17:00"/>
<Meta name="Bureau"content="London"/>
<Meta name="ContactInformation"content="04-3243-3298"/>
<Description type="instruction">Send proxy to the head office by 19:00.</Description>
</Properties>
</PlanningMetadata>
```

```
<?xml version="1.0" encoding="UTF-8"?>
<PlanningMetadata xmlns="http://xmlns.sony.net/pro/metadata/planningMetadata" assignId=H00123"
creationDate="2008-01-20T09:00:00+09:00" lastUpdate="2008-01-20T09:00:00+09:00" version="1.00">
<Properties propertyId=" assignment" update="2008-01-20T09:00:00+09:00" modifiedBy="Chris">
<!--Assignment Information (type="assignment") -->
<Title usAscii="January Grand Sumo Tournament" xml:lang="ja">OHZUMO HATSUBASHO</Title>
<Meta name="Cameraman"content="Alan"/>
<Meta name="Producer"content="David"/>
<Meta name="Reporter"content="Nina"/>
<Meta name="Location"content="RYOGOKU KOKUGIKAN"/>
<Meta name="ShootingDate"content="2008-01-20T17:00"/>
<Meta name="Bureau"content="London"/>
<Meta name="ContactInformation"content="04-3243-3298"/>
<Description type="instruction">Send proxy to the head office by 19:00.</Description>
</Properties>
<MaterialGroup>
<Material umidRef="060A2B340101010501010D4313000000090C090F008B4405B0080046020125F800"type="clip"/>
<Material umidRef="060A2B340101010501010D43130000001900A0F008B4405B0080046020125F800"type="clip"/>
<Material umidRef="060A2B340101010501010D4313000000640A0F008B4405B0080046020125F800"type="clip"/>
</MaterialGroup>
</PlanningMetadata>
```

61 — (entire block)
62 — PlanningMetadata line
63 — Properties line
64 — Title line
65 — ShootingDate line
66 — Description line
67a, 67b, 67c — Material lines

CAPTURED IMAGE DATA MANAGEMENT METHOD AND IMAGE CAPTURING APPARATUS

CROSS REFERENCES TO RELATED APPLICATIONS

The present application claims priority from Japanese Patent Application No. JP2008-101123, filed in the Japanese Patent Office on Apr. 9, 2008, the entire content of which is incorporated herein by reference.

BACKGROUND OF THE INVENTION

1. Field of the Invention

The present invention relates to a captured image data management method and an image capturing apparatus applied for a recorder-built-in type video camera that records captured image data on a medium such as an optical disc.

2. Description of the Related Art

For example, when a broadcasting station creates a news program, the broadcasting station makes a plan about what kinds of news they will collect. A camera operator collect news materials by capturing images using a recorder-built-in type video camera (hereinafter referred to as the camcorder) based on the plan. The collected materials are stored in a material recording server. The stored materials are edited and finally news program images to be broadcast are created.

To direct a camera operator to collect news materials (hereinafter this operation is referred to as coverage direction), Patent Document 1 disclosed as Japanese Patent Application Laid-Open Publication (domestic re-publication of PCT international application) No. WO01/060059 describes that meta data about a coverage direction are transmitted from a broadcasting station to an image capturing apparatus that is moved to an image capturing site (hereinafter referred to as a coverage site) through a radio communication and the image capturing apparatus records the meta data on a record medium along with image data and sound data.

SUMMARY OF THE INVENTION

In the image capturing apparatus described in the Patent Document 1, meta data created in the planning stage are recorded to a storage device of the image capturing apparatus. When images are recorded, the meta data are recorded on the record medium along with image data and sound data. However, the record medium described in the Patent Document 1 is a tape-shaped medium on which data are sequentially recorded. In recent years, camcorders that use a random-accessible record medium, for example a disc-shaped record medium, and that record image data in a predefined file structure have been practically used. Files correspond to scenes, cuts, and so forth of images that are captured and a program is created as a set of files. In this case, it is necessary to correlate files that have a smaller data unit than that in the Patent Document 1 with coverage directions.

Taking into account of the situation of a coverage site, it is necessary to receive coverage directions with flexibility. For example, it may be necessary to receive coverage directions in advance, not immediately before capturing. In addition, even if the power of the camcorder is turned off after coverage direction information is loaded thereto, the camcorder is necessary to be able to record images based on the coverage directions after it is turned on.

In view of the foregoing, it would be desirable to provide a captured image data management method and an image capturing apparatus that allow individual files and coverage directions to be automatically correlated and coverage directions to be received at timing that is not limited to immediately before capturing.

According to an embodiment of the present invention, there is provided a captured image data management method. Coverage direction data are input to a recorder-built-in type image capturing apparatus and the coverage direction data are recorded to a nonvolatile memory and a record medium. The captured image data are obtained as files. A name of the file recorded on the record medium is automatically assigned based on title information contained in the coverage direction data and the assigned file name is recorded to the nonvolatile memory and the record medium.

The coverage direction data are input to the image capturing apparatus through a USB memory or a disc.

The coverage direction data are input to the image capturing apparatus through radio communication.

In addition, a file name of a file to be recorded next time is displayed on a view finder.

The file name includes a title name and a sequence number which increments by 1 when a file is recorded.

The coverage direction contents to be set next time are automatically obtained from the nonvolatile memory and loaded to the control section when a power of the image capturing apparatus is turned on.

In addition, an identifier of a recorded file is additionally written to the coverage direction data.

According to an embodiment of the present invention, there is provided an image capturing apparatus. The image capturing apparatus includes an image capturing section, a signal processing section, a view finder, a medium interface section, and a control section. The signal processing section performs a signal process for a captured image signal received from the image capturing section. The medium interface section interfaces with a record medium. The control section includes a computer and a nonvolatile memory. The operation section, the display section, and the input interface section are connected to the control section. The control section controls at least one of the medium interface section and the input interface section to obtain coverage direction data. The control section records the coverage direction data to the nonvolatile memory and the record medium. The control section automatically assigns a name of a file recorded on the record medium based on title information contained in the coverage direction data and records the assigned file name to the nonvolatile memory and the record medium.

According to an embodiment of the present invention, a name of a file recorded is automatically created based on title information contained in coverage direction data. Thus, operations from a capturing operation to an exporting operation for a material server of a broadcasting station can be effectively performed.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 8 is a schematic diagram showing an example of coverage direction contents displayed on a liquid crystal display section;

FIG. 9 is a flow chart showing a process performed in the case that coverage direction contents are automatically loaded from a nonvolatile memory when the power of the camcorder is turned on;

FIG. 10 is a flow chart of a process performed in the case that coverage direction contents are automatically loaded from a disc when the power of the camcorder is turned on;

FIG. 13 is a schematic diagram describing name assignment rules based on title information in coverage direction data;

FIG. 14 is a schematic diagram showing exemplary coverage direction data; and

FIG. 15 is a schematic diagram showing contents of coverage direction data after recording is performed based on a coverage direction.

DETAILED DESCRIPTION OF THE PREFERRED EMBODIMENTS

Figure 1:
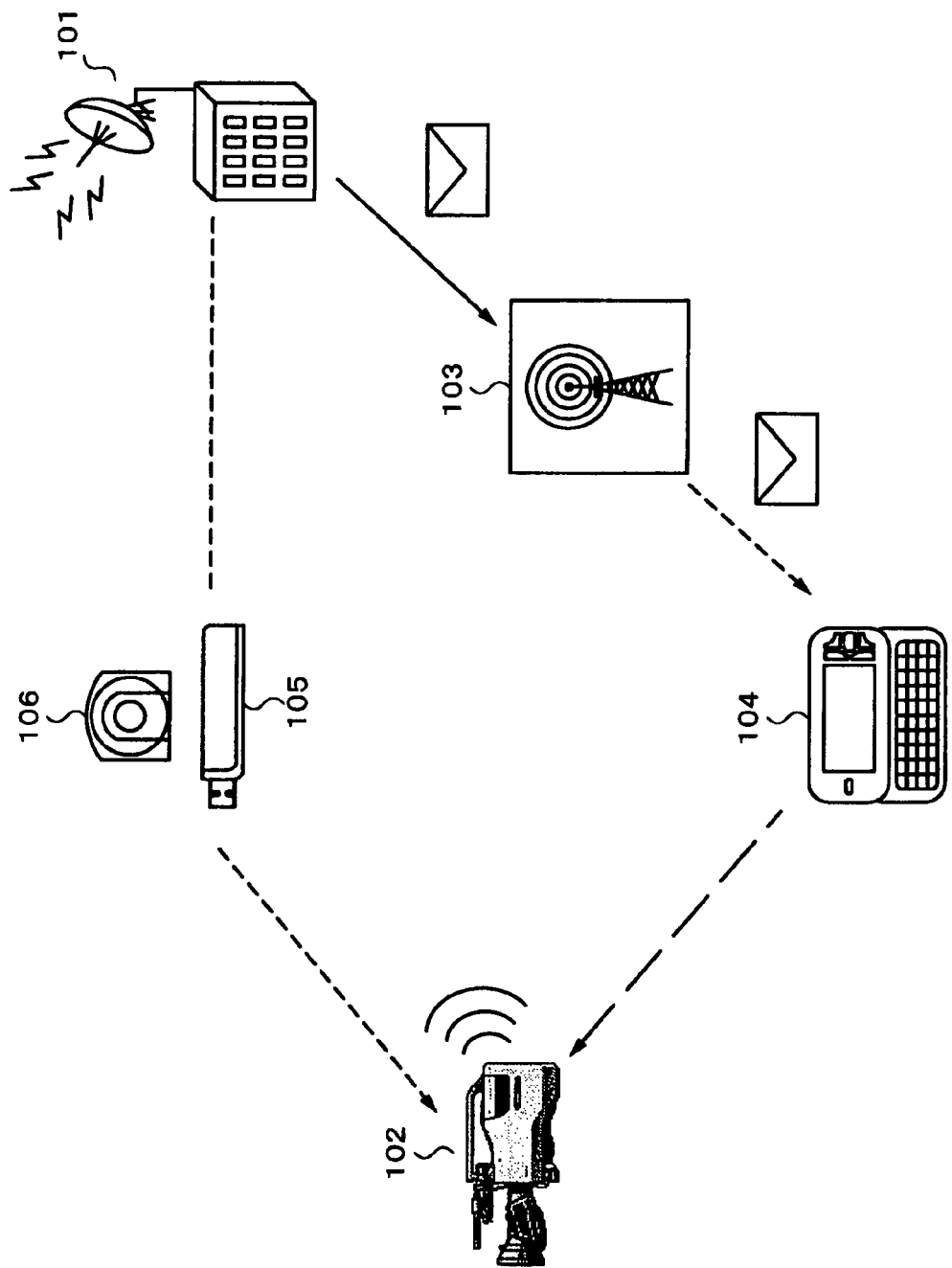
FIG. 1 is a schematic diagram describing a plurality of methods of inputting coverage direction data to a camcorder.

Next, with reference to the accompanying drawings, embodiments of the present invention will be described. Although these embodiments that will be described in the following are preferred ones of the present invention and various technically preferably limitations are imposed thereto, it is appreciated that the scope of the present invention is not limited to these embodiments unless described that they impose limitations to the present invention.

According to an embodiment of the present invention, there is provided a captured image data management method. Coverage direction data are input to a recorder-built-in type image capturing apparatus and the coverage direction data are recorded to a nonvolatile memory and a record medium (input through a radio LAN shown in FIG. 3, input through a USB memory shown in FIG. 5, and input through a disc shown in FIG. 6). The captured image data are obtained as files (a record process shown in FIG. 11). A name of the file recorded on the record medium is automatically assigned based on title information contained in the coverage direction data and the assigned file name is recorded to the nonvolatile memory and the record medium (at steps S93 to S96 shown in FIG. 11 and steps 5104 and 5105 shown in FIG. 12).

According to an embodiment of the present invention, there is provided an image capturing apparatus. The image capturing apparatus includes an image capturing section (camera block 1), a signal processing section 2, a view finder 3, a medium interface section (disc drive 4), a control section 5, an operation section, a display section, and an input interface section (operation panel and liquid crystal display section 10, USB memory interface 11, radio LAN interface 12). The signal processing section 2 performs a signal process for a captured image signal received from the image capturing section (camera block 1). The medium interface section (disc drive 4) interfaces with a record medium. The control section includes a computer 6 and a nonvolatile memory 9. The operation section, the display section, and the input interface section (an operation panel and liquid crystal display section 10, a USB memory interface 11, and a radio LAN interface 12) are connected to the control section 5. The control section 5 controls at least one of the medium interface section and the input interface section to obtain coverage direction data. The control section 5 records the coverage direction data to the nonvolatile memory 9 and the record medium (disc). The control section 5 automatically assigns a name of a file recorded on the record medium based on title information contained in the coverage direction data and records the assigned file name to the nonvolatile memory 9 and the record medium (disc).

For example, the coverage direction data and the assigned file name are transferred from the DRAM 8 of the control section 5 to the nonvolatile memory 9 and the coverage direction data and the assigned file name are transferred from the DRAM 8 to the record media (disc) and recorded thereon. The coverage direction data and the assigned file name are transferred from the DRAM 8 to the record medium (disc) and recorded thereon.

Next, with reference to FIG. 1, an embodiment of the present invention will be described in brief. In a broadcasting station 101, a coverage plan, for example, of a news program is created and coverage directions thereof are created. The coverage directions are input to a camcorder that records news materials. Coverage directions can be input in the following three types of methods.

In the first method, coverage direction data (since they represent coverage direction contents, they may be referred to as coverage direction contents in the following description) attached to electronic mail are transmitted from the broadcasting station 101 to a smart phone 104 through a network 103. The smart phone 104 receives the coverage direction data and transmits them to a camcorder 102 through a radio local area network (LAN).

In the second method, the broadcasting station 101 inputs coverage direction data to the camcorder 102 through a universal serial bus (USB) memory 105. In the third method, the broadcasting station 101 inputs coverage direction data to the camcorder 102 through a disc 106. In the broadcasting station 101, coverage direction data are pre-written to the USB memory 105 and the disc 106.

The camcorder 102 uses, for example, the disc 106 as a record medium. Image data and sound data are recorded on the disc 106 where the coverage direction data are written. The disc 106 includes a cartridge, a phase-change optical disc housed in the cartridge, and a shutter that protects the optical disc. The disc 106 uses a 405-nm wavelength laser. When the disc 106 is a single-layer type optical disc, it has a storage capacity of 23.3 GB. When the disc 106 is a double-layer type optical disc, it has a storage capacity of 50 GB.

Recorded on the disc 106 are high resolution image-sound data compressed, for example, according to moving picture expert group 2 (MPEG2). In addition, additional information about recorded images, such as date, time, various types of comments, and so forth, and proxy audio visual (AV) data (low-bit rate image data) that can be used for offline editing are recorded as meta data on the disc 106. Coverage direction data are recorded as one type of meta data on the disc 106. Data are recorded as files on the disc 106. Files are high resolution image-sound data corresponding to scenes, cuts, and so forth and are also referred to as clips. A program is a set of clips. Various types of file formats can be used.

Coverage direction data contain a title of a coverage direction. The camcorder 102 adds a clip name (file name) to a recorded clip. For example, three types of file name assignment methods are provided. The user sets one of these methods. In other words, a method of assigning a regular file name, a method of assigning a file name corresponding to a user's input title, or a method of assigning a file name corresponding to a title of a coverage direction is pre-set. However, when a file name is assigned based on a title of a coverage direction, a later edit process can be effectively performed.

Figure 2:
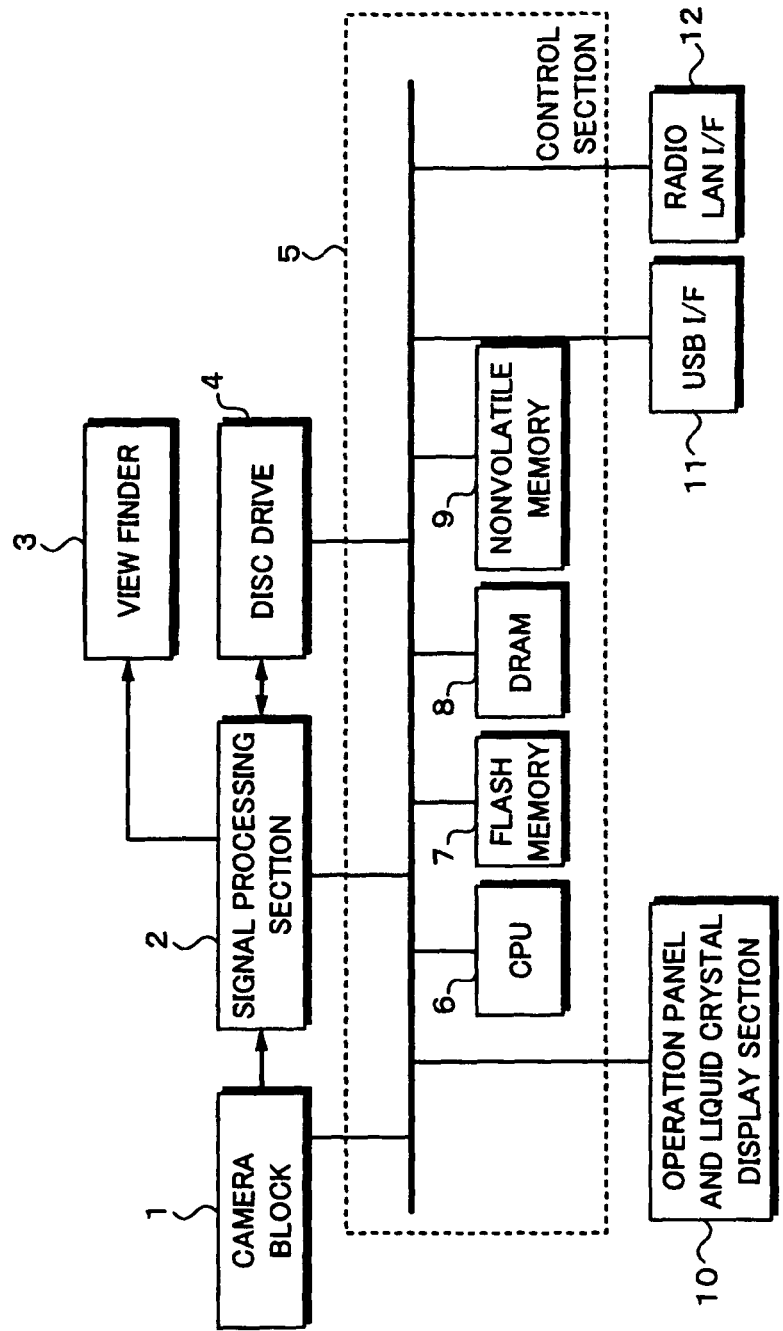
FIG. 2 is a block diagram of the camcorder according to an embodiment of the present invention.

Next, with reference to FIG. 2, the structure of the camcorder 102 will be described. A camera block 1 includes an image sensor, an image sensor drive circuit, a lens system, an A/D converter, and so forth. Captured image data are supplied from the camera block 1 to a signal processing section 2. The signal processing section 2 performs signal processes such as a compression-encoding process, an error-correction encoding process, a formatting process, and so forth for the captured image data. In addition, the signal processing section 2 performs processes such as a de-formatting process, an error-correction-code decoding process, a decompression-decoding process, and so forth for data reproduced from the disc.

A captured image is displayed on a view finder 3 that is connected to the signal processing section 2. connected to the signal processing section 2 is a disc drive 4. The disc drive 4 records data to the optical disc and supplies data that are read from the disc to the signal processing section 2.

A control section 5 that controls the camera block 1, the signal processing section 2, and the disc drive 4 is provided. The control section 5 is provided with a central processing unit (CPU) 6 that totally controls the camcorder 102. Connected to the CPU 6 are a flash memory 7, a dynamic random access memory (DRAM) 8, and a nonvolatile memory 9. The DRAM 8 and the nonvolatile memory 9 store necessary data under the control of the CPU 6. The DRAM 8 and the nonvolatile memory 9 store, for example, coverage direction data and assigned file names.

Moreover, connected to the control section 5 are an operation panel and liquid crystal display section 10 such that user's operation information is supplied to the control section 5 and information from the control section 5 can be displayed on the liquid crystal panel. Connected to the control section 5 are a USB memory interface 11 and a radio LAN interface 12.

Coverage direction data are one type of meta data and have a format that the control section 5 of the camcorder 102 can interpret. Coverage direction data are, for example, an extensible markup language (XML) format file.

[Input of Coverage Direction File to Camcorder]

Coverage direction files can be input to the camcorder in the following three types of methods. Coverage direction data are described in coverage direction files. In a first method, a coverage direction file is transferred using a smart phone to the camcorder through the radio LAN. The smart phone is a mobile phone that has not only a communication function, but a function of a computer. A coverage direction attached to electronic mail is transmitted from the broadcast station to the smart phone. The smart phone receives mail of the coverage direction and checks for the coverage direction contents. Thereafter, the smart phone transfers the coverage direction file to the camcorder through the radio LAN.

Instead of the smart phone, another device such as a PDA, a portable personal computer, or the like can be used as long as the device has a function that receives electronic mail and transfers a received coverage direction file contained in the electronic mail to the camcorder through the radio LAN.

In a second method, a coverage direction file is input to the camcorder through a USB memory. In the broadcasting station, a coverage direction file is written to the USB memory. The USB memory is attached to the camcorder. The camcorder reads the coverage direction file from the USB memory. A memory card can be used instead of the USB memory.

In a third method, a coverage direction file is input to the camcorder through a disc. In the broadcasting station, a coverage direction file is written as meta data to the disc. This disc is the same as that the camcorder uses to collect news materials. This disc is inserted into the camcorder. The coverage direction file is read from the disc to the camcorder.

Figure 3:
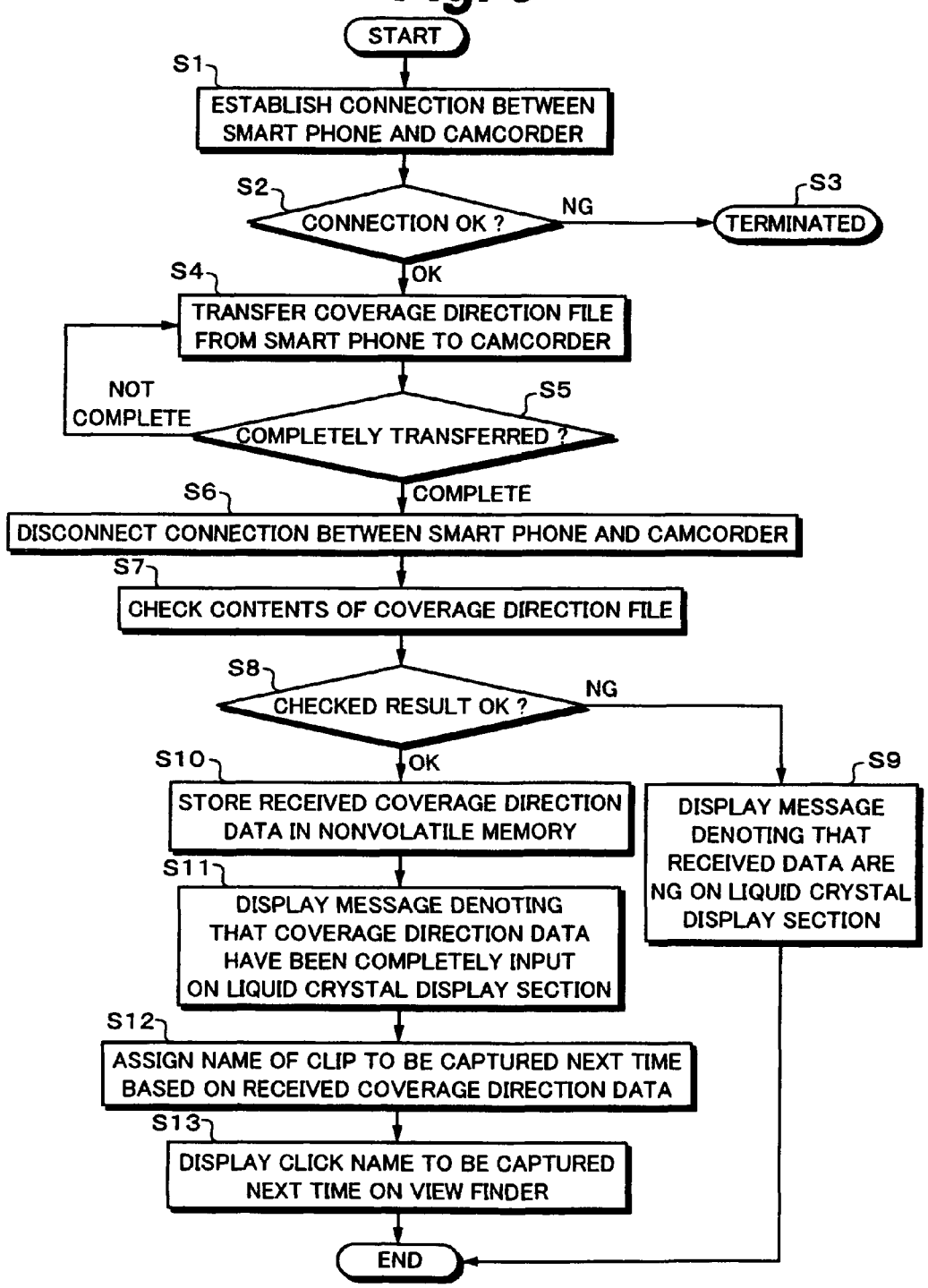
FIG. 3 is a flow chart describing a method of inputting coverage direction data to the camcorder through a radio LAN according to an embodiment of the present invention.

Next, with reference to a flow chart shown in FIG. 3, a method of using the smart phone and inputting a coverage direction file to the camcorder through the radio LAN will be described in detail. The process described in the flow chart is performed under the control of the CPU of the control section of the camcorder. At step S1, a connection between the smart phone and the camcorder is established through the radio LAN. At step S2, it is determined whether or not the connection has been established (OK). If the connection has not been established, the process is terminated (at step S3).

When the determined result at step S2 denotes that the connection has been established, the flow advances to step S4. At step S4, a coverage direction file is transferred from the smart phone to the camcorder. The received coverage direction file is written to the disc that has been prepared for collecting news materials and inserted into the camcorder. At step S5, it is determined whether or not the coverage direction file has been completely transferred to the camcorder. Data are transferred until the file has been completely transferred.

When the determined result at step S5 denotes that the file has been completely transferred, the flow advances to step S6. At step S6, the radio connection between the smart phone and the camcorder is disconnected.

The camcorder checks for the contents of the coverage direction file (at step S7). In other words, the control section of the camcorder analyzes the contents of data of the received coverage direction file and checks whether or not they are correct. At step S8, it is determined whether or not the checked result is correct (OK). If the checked result is not correct (NG), the flow advances to step S9. At step S9, a message denoting that the received data are NG is displayed on the liquid crystal display section and the process is terminated.

When the determined result at step S8 is correct, the flow advances to step S10. At step S10, the received coverage direction file is stored in the nonvolatile memory. In this case, a part of the coverage direction file may be stored because of restriction of the storage capacity of the nonvolatile memory. However, the entire coverage direction file is written as meta data to the disc. At step S11, a message that denotes that the coverage direction file has been completely input is displayed on the liquid crystal display section.

At step S12, a name of a clip to be captured next time is assigned based on the received coverage direction file. In this case, an initial value (001) of a "three-digit numeric value" contained in a clip name is stored in the nonvolatile memory. At step S13, the name of the clip assigned to be captured next time is displayed on the view finder and the process is completed.

Figure 4:
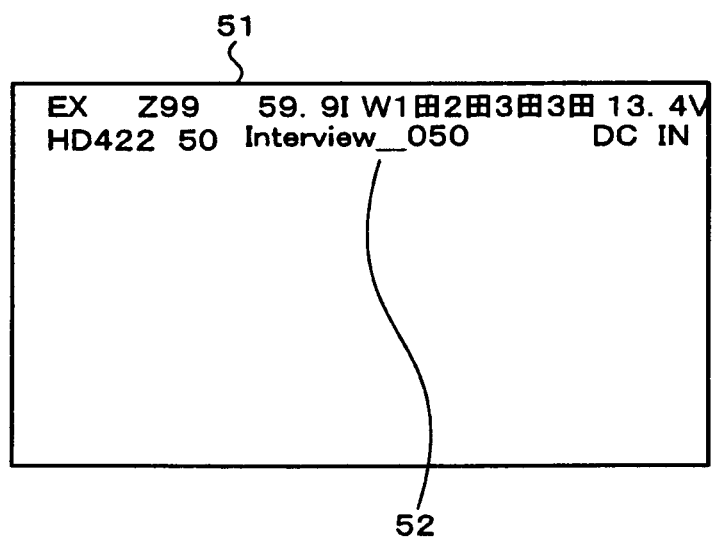
FIG. 4 is a schematic diagram showing an exemplary display of a clip name in input coverage direction data.

At step S13, "Interview_050" is displayed as a clip name 52 on a view finder 51 of the camcorder as shown in FIG. 4.

Figure 5:
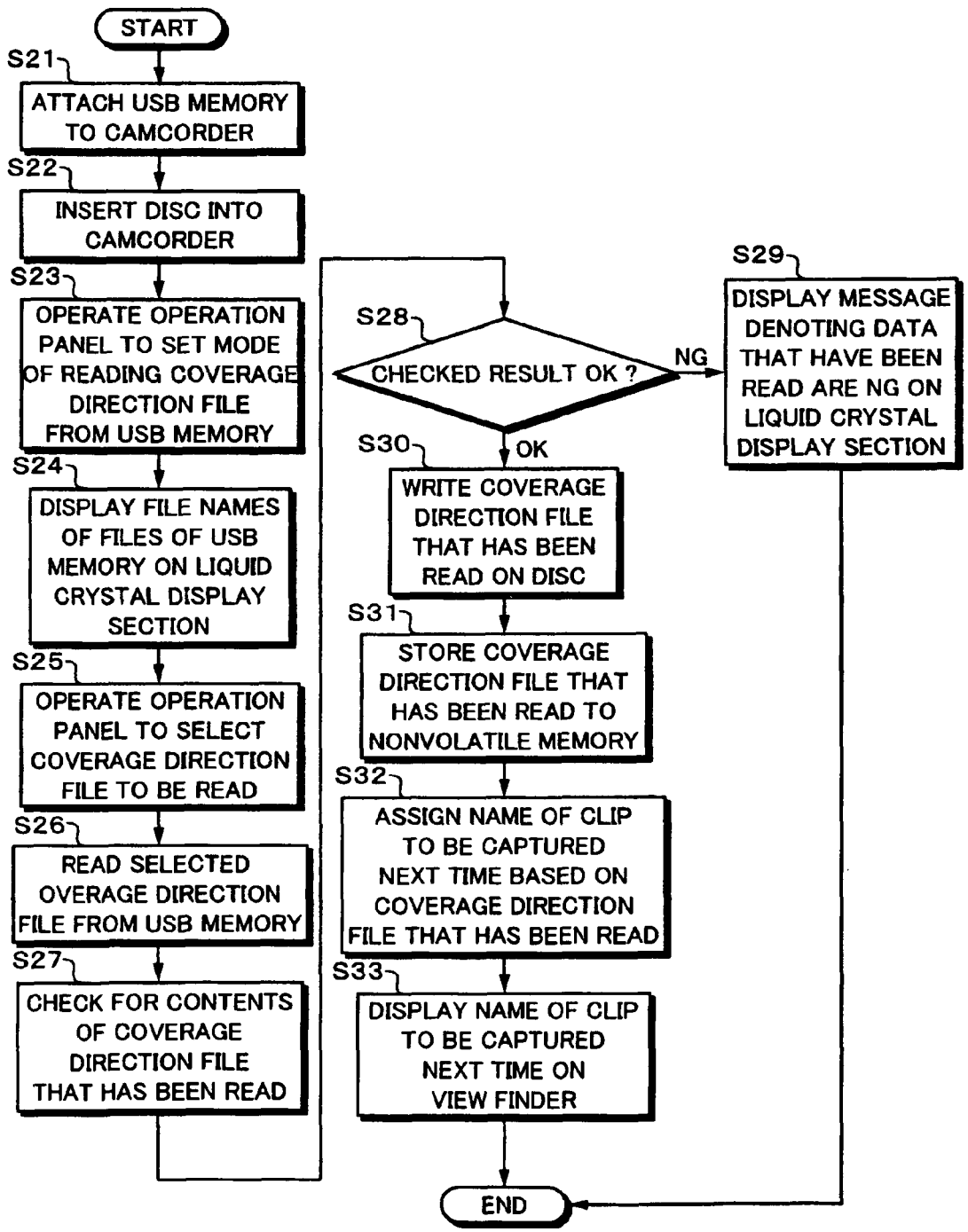
FIG. 5 is a flow chart describing a method of inputting coverage direction data to the camcorder through a USB memory according to an embodiment of the present invention.

Next, with reference to FIG. 5, a method of inputting a coverage direction file to the camcorder through a USB memory will be described in detail. At step S21, the USB memory to which a coverage direction file has been written in the broadcasting station is attached to the camcorder. At step S22, a disc is inserted into the camcorder to write the coverage direction file to the disc.

At step S23, the operation panel is operated to set a read mode for reading a coverage direction file from the USB memory.

At step S24, a file name of the coverage direction file stored in the USB memory is displayed on the liquid crystal display section. At step S25, the operation panel is operated to select a coverage direction file from those stored in the USB memory.

At step S26, the selected coverage direction file is read from the USB memory. At step S27, the contents of the coverage direction file are checked. In other words, the control section of the camcorder analyzes the contents of the coverage direction file that has been read and checks whether or not they are correct.

At step S28, it is determined whether or not the checked result is correct (OK). When the checked result is not correct (NG), the flow advances to step S29. At step S29, a message that denotes that the data that have been read are NG is displayed on the liquid crystal display section and the process is terminated.

When the determined result at step S28 is correct, the flow advances to step S30. At step S30, the coverage direction file that has been read is written to the disc. At step S31, the coverage direction file that has been read is stored in the nonvolatile memory. In this case, only a part of the coverage direction file may be stored because of restriction of the storage capacity of the nonvolatile memory. However, the entire coverage direction file is written to the disc.

At step S32, a name of a clip to be captured next time is assigned. An initial value (001) of a "three-digit numeric value" contained in the clip name is stored in the nonvolatile memory. At step S33, the name of the clip assigned to be captured next time is displayed on the view finder and the process is completed.

Figure 6:
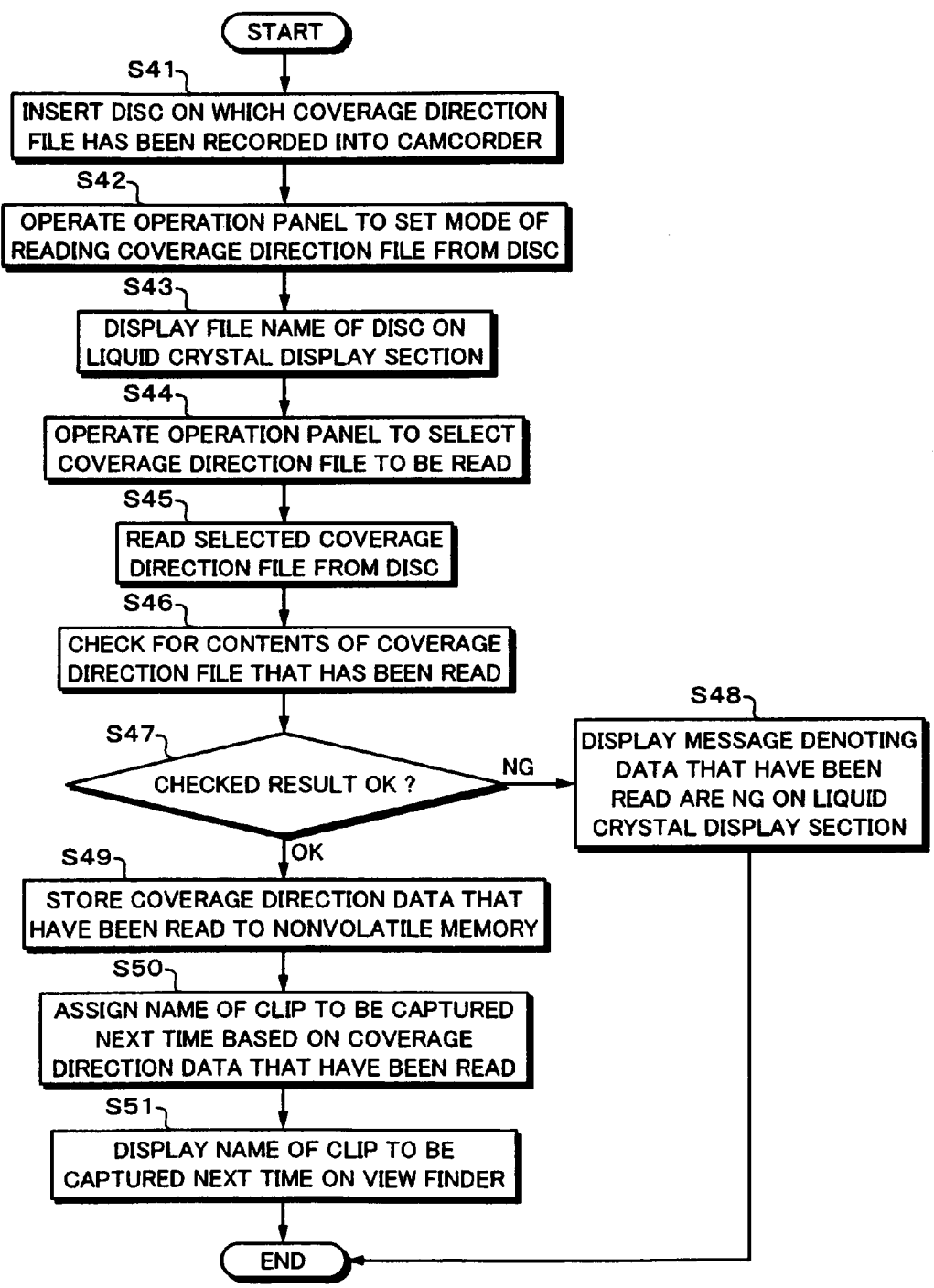
FIG. 6 is a flow chart describing a method of inputting coverage direction data to the camcorder through a disc according to an embodiment of the present invention.

Next, with reference to FIG. 6, a method of inputting a coverage direction file to the camcorder through a disc will be described in details. At step S41, a disc on which a coverage direction file has been written in the broadcasting station is inserted into the camcorder.

At step S42, the operation panel is operated to set the read mode of reading a coverage direction file from a disc.

At step S43, file names of files recorded on the disc are displayed on the liquid crystal display section. At step S44, the operation panel is operated to select a coverage direction file to be read.

At step S45, the selected coverage direction file is read from the disc. At step S46, the contents of the coverage direction file that has been read are checked. In other words, the control section of the camcorder analyzes the contents of data of the coverage direction file that has been read and checks whether or not they are correct.

At step S47, it is determined whether or not the checked result is correct (OK). When the checked result is not correct (NG), the flow advances to step S48. At step S48, a message that denotes that the data that have been read are NG is displayed on the liquid crystal display section and the process is terminated.

When the determined result at step S47 is correct, the flow advances to step S49. At step S49, the coverage direction data that have been read are stored in the nonvolatile memory. In this case, only a part of the coverage direction file may be stored because of restriction of the storage capacity of the nonvolatile memory. However, the entire coverage direction file is written to the disc.

At step S50, a name of a clip to be captured next time is assigned. An initial value (001) of a "three-digit numeric value" contained in the clip name is stored in the nonvolatile memory. At step S51, the name of the clip assigned to be captured next time is displayed on the view finder and the process is completed.

[Checking for Contents of Coverage Direction that is Input]

Figure 7:
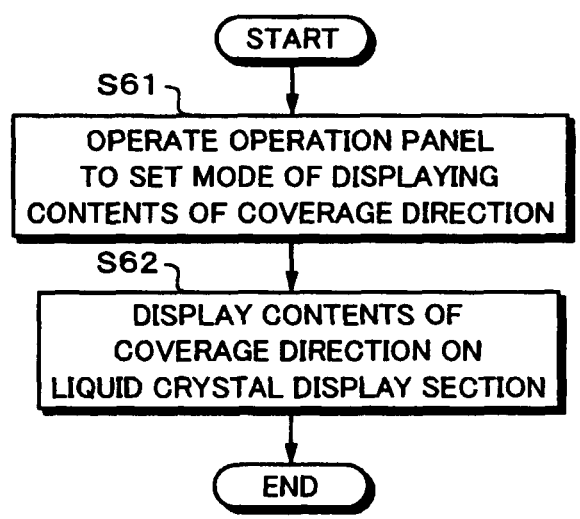
FIG. 7 is a flow chart showing a process performed in the case that contents of an input coverage direction are checked according to an embodiment of the present invention.

Contents of a coverage direction file that has been input in any one of the foregoing three types of methods can be displayed on the liquid crystal display section. At step S61 shown in FIG. 7, the operation panel of the camcorder is operated to set a mode of displaying coverage direction contents. At step S62, the coverage direction contents are displayed on the liquid crystal display section.

As shown in FIG. 8, exemplary coverage direction contents are displayed on the view finder 51. The coverage direction contents include "direction ID", "direction preparation date/time", "direction update date/time", "director", "title (English)", "title (Japanese)", "coverage site", "coverage date", and "number of recorded clips".

[Automatic Loading of Contents of Coverage Direction Upon Power-On]

As described above, after coverage direction contents are input, even if the power of the camcorder is turned off, when the power of the camcorder is turned on next time, the coverage direction contents that have been input are loaded to the DRAM (see FIG. 2) of the control section of the camcorder. Thus, since the coverage direction is pre-input, news materials can be immediately recorded.

Figure 9:
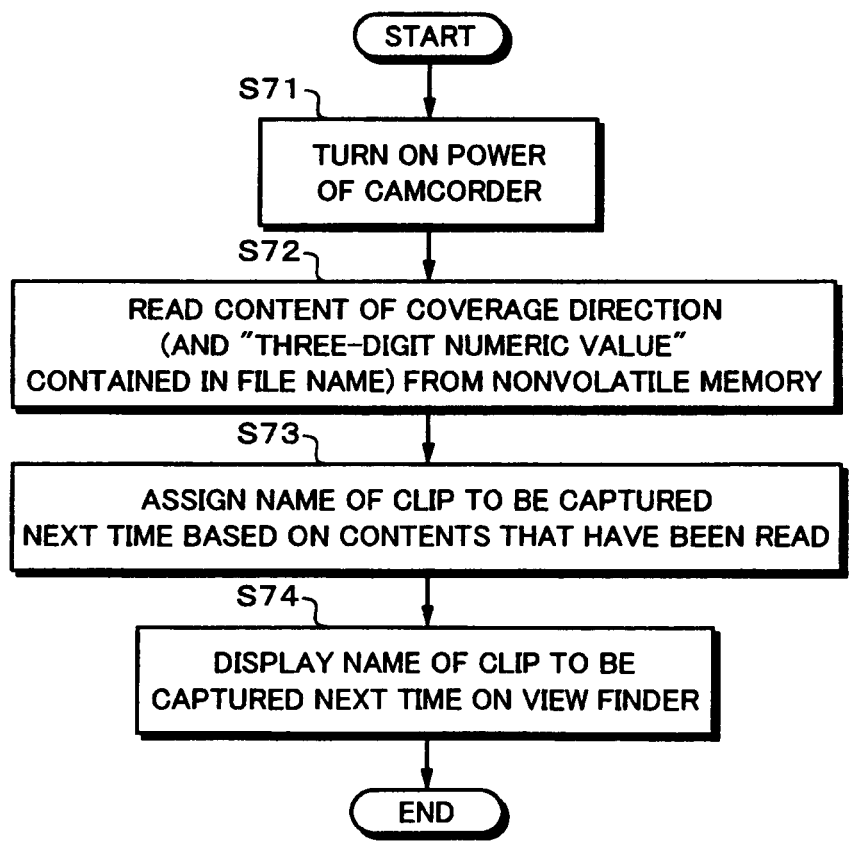

At step S71 shown in FIG. 9, the power of the camcorder is turned on. At step S72, the coverage direction contents and a "three-digit numeric value" contained in the file name are read from the nonvolatile memory.

At step S73, a name of a clip to be captured next time is assigned based on the contents that have been read. At step S74, the name of the clip to be captured next time is displayed on the view finder.

After the foregoing automatic load process has been performed, when a disc has been inserted into the camcorder, the operation of automatically loading a coverage direction file to the memory of the control section is performed. As described above, since the storage capacity of the nonvolatile memory is restricted, only a part of information of the coverage direction file may have been stored. Thus, when the same file has been recorded on the disc, the contents of the file are read from the disc that contains all information.

Figure 10:
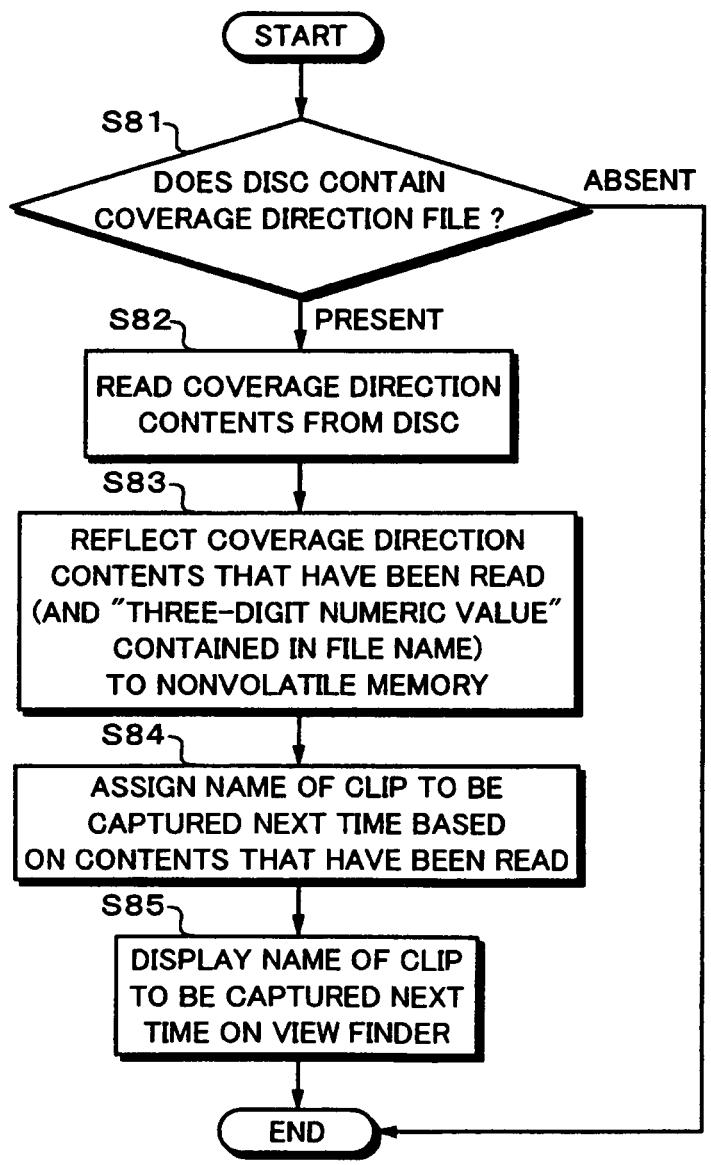

At step S81 shown in FIG. 10, it is determined whether or not the disc contains a coverage direction file having the same file name as that of a file stored in the nonvolatile memory. When the determined result denotes that the disc does not contain such a coverage direction file, the process is completed.

When the determined result at step S81 denotes that the disc contains such a coverage direction file, the flow advances to step S82. At step S82, the coverage direction contents are read from the disc. At step S83, the coverage direction contents that have been read and the three-digit numeric value containing the file name are reflected in the nonvolatile memory.

At step S84, a name of a clip to be captured next time is assigned based on the contents that have been read. At step S85, the name of the clip to be captured next time is displayed on the view finder.

[Execution of recording based on coverage direction]

When a clip is recorded by the camcorder in which a coverage direction file has been input, a title is automatically assigned to the recorded clip based on the coverage direction file.

Figure 11:
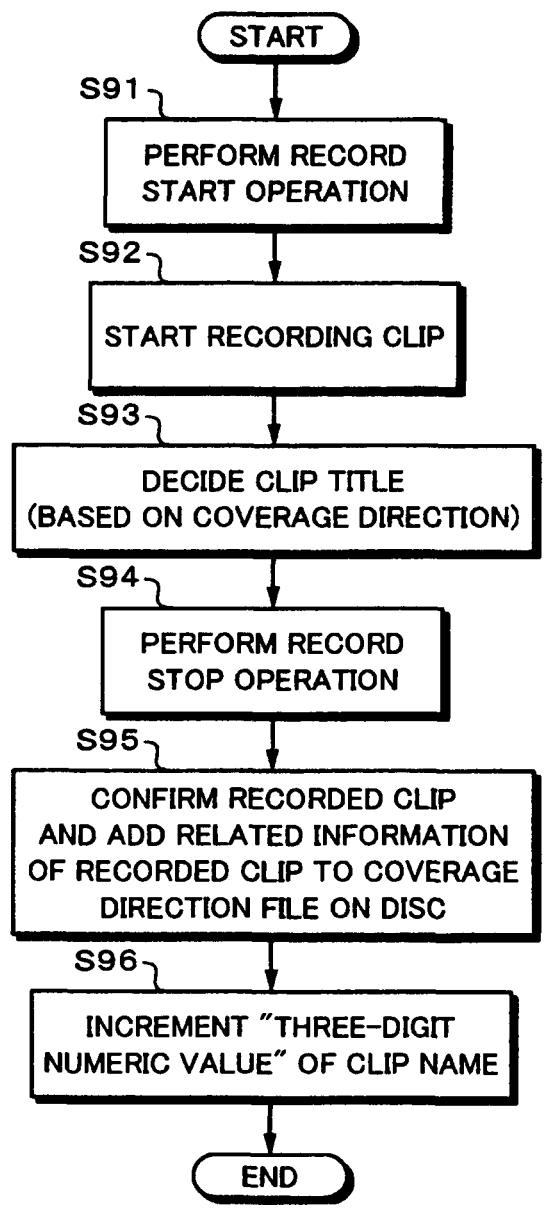
FIG. 11 is a flow chart showing a process performed in the case that recording is performed based on a coverage direction according to an embodiment of the present invention.
Figure 12:
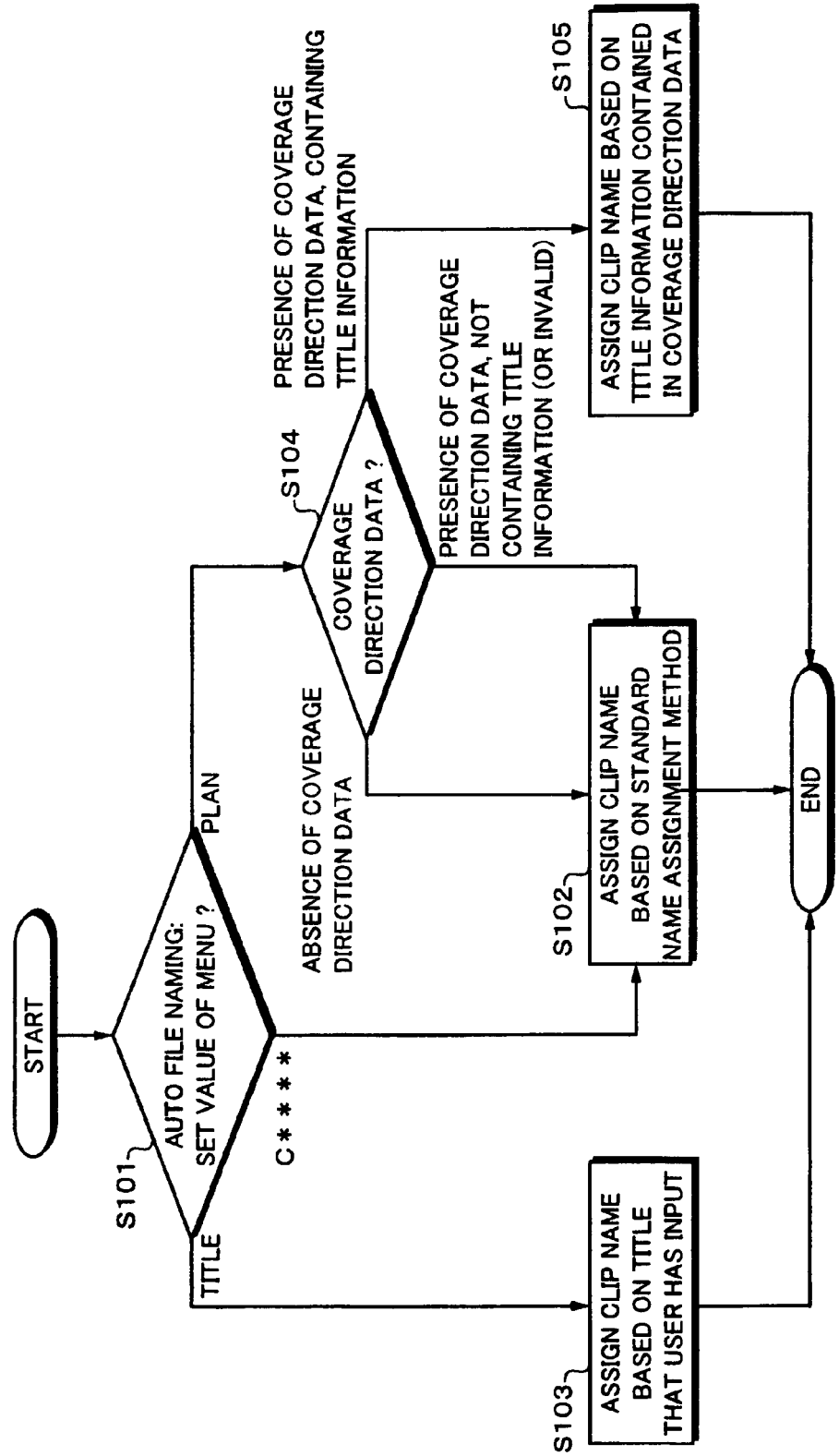
FIG. 12 is a flow chart showing a process performed in the case that a name assignment method for a clip is selected by setting a menu according to an embodiment of the present invention.

At step S91 shown in FIG. 11, a record start operation is performed in the camcorder. At step S92, the recording of a clip is started. At step S93, a title of the clip is assigned based on the coverage direction contents.

At step S94, a record stop operation is performed. At step S95, the recorded clip is confirmed. Related information of the recorded clip is added to the coverage direction file recorded on the disc. At step S96, the "three-digit numeric value" of the clip name is incremented and a name of a clip to be captured next time is assigned. At this point, the contents of the nonvolatile memory are updated with the incremented "three-digit numeric value".

[Clip Name Assignment Rules]

A name of a clip can be assigned in the following three types of methods.

1. Standard name assignment

A capital "C" is followed by a four-digit numeric value (automatically assigned), e.g. "C0001".

2. Name assignment based on title assigned by user

A title that the user inputs with a menu operation of the camcorder main body.

3. Name assignment based on title information contained in coverage direction data This method is a feature of this embodiment of the present invention and will be described later in detail.

These three types of methods are selected by menu setting using the operation panel and the liquid crystal display section of the camcorder main body. Selection of the clip name assignment methods by menu setting will be described with reference to FIG. 12.

At step S101, the setting of menu "AUTO FILE NAMING" is checked based on the set value. If the standard name assignment method has been selected, the set value is "C****". If the name assignment method based on a title that has been input as another menu item has been selected, the set value is "title". If the name assignment method based on title information of coverage direction data has been selected, the set value is "plan". However, if there are no coverage direction data or the data do not contain title information (or they are invalid), a clip name is assigned based on the standard name assignment method.

When the determined result denotes that the set value is "C****", the flow advances to step S102. At step S102, a clip name is assigned based on the standard name assignment method and the process is completed. When the determined result denotes that the set value is "title", the flow advances to step S103. At step S103, a name of the clip is assigned based on the title that the user has input and the process is completed.

When the determined result denotes that the set value is "plan", the flow advances to step S104. At step S104, it is determined whether or not there are coverage direction data. When there are coverage direction data and they contain title information, the flow advances to step S105. At step S105, a name of the clip is assigned based on title information in the coverage direction data and the process is completed. When the determined result denotes that there are no coverage direction data or when there are coverage direction data but they do not contain title information (or invalid), the flow advances to step S102. At step S102, a name of the clip is assigned based on the standard name assignment method and the process is completed.

Next, with reference to a table shown in FIG. 13, exemplary clip name assignment based on title information contained in coverage direction data will be described. The format of clip names is defined to be "prefix based on title information"+"three-digit numeric value". The "three-digit numeric value" starts with 001 and increments by 1 whenever a new clip is created.

As shown in FIG. 13, "Prefix" depends on the contents of Title element and us-ascii attribute. Although Title (Title element) can be handled in multi-languages, taking into account of presence of systems that handle only English notation, Title can be represented only by alphabetic characters (us-ascii attribute). "Prefix" is limited to less than 53 bytes because of the restriction of the number of characters for file names restricted by the file system.

[Example of Contents of Coverage Direction Data]

Next, a specific example of coverage direction data will be described. The description format of coverage direction data is based on XML. FIG. 14 shows exemplary coverage direction contents transmitted from the broadcasting station. A first line (description portion) 61 describes that the coverage direction data are written in XML and its character code is UTF-8.

A description portion 62 preceded by the description portion 61 describes that the coverage direction data are written with "PlanningMetadata". "assignId" is an ID uniquely assigned to each coverage direction. In the broadcasting station, after a title of a coverage direction is changed, it can be identified with the ID. "creationDate" and "lastUpdate" represent the date on which the coverage direction was created and the date on which the coverage direction was last updated, respectively.

"Properties" in a description portion 63 preceded by the description portion 62 denotes that contents of basic attributes of the coverage direction start. "update" and "modifiedBy" denote when the coverage direction was last updated by whom, respectively.

A description portion 64 preceded by the description portion 63 is a title of the coverage direction. In this embodiment of the present invention, the title of the coverage direction is source information to be influenced to a recorded clip name. In this example, "ohzumo hatsubasho" is a title and "xml:lang="ja"" represents that the notation of the coverage direction is Japanese. In addition, to handle devices that display only ASCII characters, an English title is described with "usAscii=". In this example, an English title "January Grand Sumo Tournament" is used.

A description portion 65 preceded by the description portion 64 defines "Meta name=" that describes item names to be contained in the coverage direction. In this example, the description portion 65 describes a camera operator name, a producer name, a reporter name, a coverage site name, recording date/time, an office name, and appointed date/time.

"Description" in a description portion 66 that is the last description portion of the coverage direction data can describe any text (comment). In this example, the description portion 66 describes a direction (instruction) to be performed in the news collection. In this example, the description portion 66 describes "proxy AV data should be transmitted to the station by 19 o'clock".

FIG. 15 shows contents of coverage direction data in the case that news materials are recorded based on a coverage direction shown in FIG. 14. When materials are recorded based on a coverage direction, information correlated with actually recorded clips is additionally written. In FIG. 15, portions corresponding to those shown in FIG. 14 are denoted by corresponding reference numerals.

In FIG. 15, a description preceded by "MaterialGroup" is additionally written. UMIDs of recorded clips are described. UMIDs are global and unique identifiers that identify audio-visual (AV) materials and so forth internationally standardized as Society Of Motion Picture and Television Engineers (SMPTE) 330M. With these UMIDs, the user can recognize which clips recorded on the disc are based on this coverage direction.

With UMIDs, even if clip titles are changed later, their correlation information is not lost. On the other hand, the user of the device is difficult to recognize correlations with the UMIDs. Thus, there is an advantage that titles of coverage directions are reflected to clips such that the user can easily understand the correlations.

In FIG. 15, a description portion 67a is a UMID of a clip that has been recorded first time. A description portion 67b preceded by the description portion 67a is a UMID of a clip that has been recorded next time. A description portion 67c is an UMID of a clip that has been recorded third time. Although titles of clips are not described in a coverage direction file, in the example shown in FIG. 15, titles of recorded clips are as follows.

The title of the first recorded clip is "OHZUMO HATSUBASHO_001".

The title of the next recorded clip is "OHZUMO HATSUBASHO_002".

The title of the third recorded clip is "OHZUMO HATSUBASHO_003".

It should be understood by those skilled in the art that various modifications, combinations, sub-combinations and alternations may occur depending on design requirements and other factors insofar as they are within the scope of the appended claims or the equivalents thereof. For example, a semiconductor memory (a card type semiconductor, a semiconductor housed in a cartridge, etc.) may be used as a record medium as well as a disc. The format of a coverage direction file is not limited to XML as long as the image capturing apparatus can recognize the format.

What is claimed is:

1. A captured image data management method, comprising:
inputting coverage direction data to a recorder-built-in type image capturing apparatus and recording the coverage direction data to a record medium;
analyzing the coverage direction data recorded on the record medium for correctness; and
in response to the coverage direction data being correct,
recording only part of the coverage direction data to a nonvolatile memory, other than the record medium, as a result of the nonvolatile memory having a restricted storage capacity,
obtaining the captured image data as files,
automatically assigning a name of the file recorded on the record medium based on title information contained in the coverage direction data and recording the assigned file name to the nonvolatile memory and the record medium, and
displaying a file name of a file to be recorded next time on a view finder of the image capturing apparatus,
wherein the coverage direction data, attached to electronic mail, are transmitted from a broadcast station to the image capturing apparatus.

2. The captured image data management method as set forth in claim 1, wherein further coverage direction data are input to the image capturing apparatus through a USB memory or a disc.

3. The captured image data management method as set forth in claim 1, wherein further coverage direction data are input to the image capturing apparatus through radio communication.

4. The captured image data management method as set forth in claim 1, wherein the file name includes a title name and a sequence number which increments by 1 when a file is recorded.

5. The captured image data management method as set forth in claim 1, wherein coverage direction data to be set next time are automatically obtained from the part of the coverage direction data recorded in the nonvolatile memory and loaded when a power of the image capturing apparatus is turned on.

6. The captured image data management method as set forth in claim 1, further comprising:
additionally writing an identifier of a recorded file to the coverage direction data.

7. The captured image data management method as set forth in claim 1, wherein a UMID is recorded when a file is recorded.

8. An image capturing apparatus, comprising:
an image capturing section;
a signal processing section which performs a signal process for a captured image signal received from the image capturing section;
a view finder;
a medium interface section which interfaces with a record medium;
a control section which includes a computer and a nonvolatile memory other than the record medium and having a restricted storage capacity; and
an operation section, a display section, and an input interface section connected to the control section,
wherein the control section controls at least one of the medium interface section and the input interface section to obtain coverage direction data,
wherein the control section records the coverage direction data to the record medium and analyzes the coverage direction data recorded on the record medium for correctness, and
in response to the coverage direction data being correct,
the control section records only part of the coverage direction data to the nonvolatile memory as a result of the restricted storage capacity of the nonvolatile memory, automatically assigns a name of a file recorded on the record medium based on title information contained in the coverage direction data, and records the assigned file name to the nonvolatile memory and the record medium, and
the view finder displays a file name of a file to be recorded next time,
wherein the coverage direction data, attached to electronic mail, are transmitted from a broadcast station to the image capturing section.

9. The image capturing apparatus as set forth in claim 8, wherein a UMID is recorded when a file is recorded.

10. The image capturing apparatus as set forth in claim 8, wherein the coverage direction data are input to the image capturing apparatus through a USB memory.

11. The image capturing apparatus as set forth in claim 8, wherein further coverage direction data are input to the image capturing apparatus through a disc.

12. The image capturing apparatus as set forth in claim 8, wherein further coverage direction data are input to the image capturing apparatus through radio communication.

13. The image capturing apparatus as set forth in claim 8, wherein the file name includes a title name and a sequence number which increments by 1 when a file is recorded.

14. The image capturing apparatus as set forth in claim 8, wherein coverage direction data to be set next time are automatically obtained from the part of the coverage direction data recorded in the nonvolatile memory and loaded to the control section when a power of the image capturing apparatus is turned on.

* * * * *